(12) United States Patent
Sanderson et al.

(10) Patent No.: US 6,279,906 B1
(45) Date of Patent: Aug. 28, 2001

(54) VIDEO GAME CONTROLLER SYSTEM WITH INTERCHANGEABLE INTERFACE ADAPTERS

(75) Inventors: Joel Sanderson, Richmond; Bounchanh Thanasack, Surrey, both of (CA)

(73) Assignee: ACT Labs, Ltd., Richmond (CA)

( * ) Notice: Subject to any disclaimer, the term of this patent is extended or adjusted under 35 U.S.C. 154(b) by 0 days.

(21) Appl. No.: 09/099,283

(22) Filed: Jun. 18, 1998

Related U.S. Application Data

(60) Provisional application No. 60/050,431, filed on Jun. 18, 1997.

(51) Int. Cl.[7] .................................................... A63F 9/24
(52) U.S. Cl. ........................ 273/148 B; 463/36; 463/37; 463/38
(58) Field of Search .................................. 463/1, 36, 37, 463/38, 39; 273/148 B; 345/156, 158, 161

(56) References Cited

U.S. PATENT DOCUMENTS

| | | |
|---|---|---|
| 5,610,631 | 3/1997 | Bouton et al. . |
| 5,643,087 | * 7/1997 | Marcus et al. ........................ 463/38 |
| 5,766,079 | * 6/1998 | Kataoka et al. ...................... 463/36 |
| 5,896,125 | * 4/1999 | Niedzwiecki ........................ 345/168 |

FOREIGN PATENT DOCUMENTS

06031057  *  2/1994  (JP) ................................ A63F/9/22

OTHER PUBLICATIONS

"Do Try This at Home", Curt Feldman, GameSpot News, May 15, 1997.

* cited by examiner

Primary Examiner—Joe H. Cheng
Assistant Examiner—Julie Kasick
(74) Attorney, Agent, or Firm—Greenberg Traurig, LLP; Anthony R. Barkume

(57) ABSTRACT

A modular video game controller device that can be adapted to operate with any of a number of various video game platforms such as a PC-based system or any of the commercially-available dedicated game consoles. The video game controller system of the present invention thus comprises a base unit such as a steering wheel and a plurality of game playing switches for use by the game player, a video game playing platform such as a PC-based platform or a dedicated console, and a video game controller interface adapter for interconnecting the base unit and the video game playing platform in accordance with the specific electrical and physical characteristics of the video game playing platform. A variety of interface adapters are contemplated, each of which interfaces in a standard manner to the base unit, and which interfaces in a dedicated manner to the particular video game playing platform for which it has been designed. In this manner, a player simply needs to obtain an interface adapter configured for his type of gaming platform and utilize the standard base unit therewith. This advantageously allows the base unit to be used on a variety of gaming platforms by simply changing the interface adapter as required.

9 Claims, 11 Drawing Sheets

VIDEO GAME CONTROLLER SYSTEM WITH INTERCHANGEABLE INTERFACE ADAPTERS

CROSS-REFERENCE TO RELATED APPLICATIONS

This patent application claims priority of co-pending U.S. Provisional Application Ser. No. 60/050,431 which was filed on Jun. 18, 1997 and is hereby incorporated by reference.

BACKGROUND OF THE INVENTION

This invention relates to video game controllers and in particular to video game controllers having a modular interface system which allows the game player to operate the video game controller with a variety of different video gaming platforms having different physical and electrical connectivity requirements.

In the home-based video game industry, there exist two basic types of gaming platforms—the dedicated video game console and the general purpose personal computer (PC). A dedicated video game console is a specific computer-based device that executes only video game software that is typically resident on a memory chip mounted within an insertable plastic cartridge or on a CD-ROM. The images and sounds generated by the game are output to a television for display to the user in a manner well known in the art. Various manufacturers make and sell dedicated game consoles that have proprietary, rather than industry-standard, interfaces and protocols that are not interchangeable with each other. For example, NINTENDO™, SEGA™, and SONY™ each market game consoles that have different standards and interfaces that are not electrically or physically compatible with each other. The PC gaming platform allows a video game to execute as an application program, wherein the images are displayed on the monitor and sounds are played through a sound card and speakers. In both types of platforms, the user is provided with an input/output device called a video game controller to interact with the game program and cause certain events to occur. The video game controller may be a keyboard, steering wheel, foot pedals, joystick, trackball or simulated light gun which is connected to a standard game port located on an interface board in the PC (or to another port such as the keyboard port, a serial port or a parallel port) or directly to an input port of the game console for dedicated console applications. The user maintains control over the video program via signals sent between the video game controller and the personal computer or console which are derived in response to the selection or setting of a variety of switches, buttons, dials, and triggers located on the video game controller.

Many of the video game controllers of the prior art have limited functionality in that they are designed and manufactured to interface with only a single type of gaming platform; that is, either the PC platform or one of the many dedicated game console platforms. Thus, once the user has purchased a particular video game controller he can only use it with the platform that it is configured (both electrically and physically) to operate with. If the gaming platform becomes obsolete, then the video game controller is undesirably rendered useless since it cannot be used with other gaming platforms due to the different electrical and physical interfaces.

Naturally, if the user so desires he may purchase more than one video game controller to accommodate these various platforms; however, as complexity of such devices increases, so does their cost. This tends to make it prohibitively expensive for the majority of users to own more than one video game controller. Another factor which mitigates against the purchase of more than one video game controller is that once the typical user has achieved some level of familiarity and proficiency with one particular video game controller, it is unlikely that he will be enthusiastic about doing the same for another video game controller.

Therefore, it would be advantageous if the video game controller could be readily and easily adapted for use with a variety of different gaming platforms in a cost effective manner. It would also be advantageous for the video game controller to be upgradeable in order to be used with future gaming platforms that have not yet been designed.

SUMMARY OF THE INVENTION

In accordance with the present invention, a video game controller interface adapter is provided comprising means for translating standard output signals from a base unit into platform-specific input signals for a video game playing platform, first means for connecting the means for translating with the base unit, and second means for connecting the means for translating with the video game playing platform. The video game controller interface adapter may further comprise means for associating keycodes input from a keyboard with selection of switches and controls on the base unit and means for outputting the associated keycodes to the video game playing platform in response to selection of switches and controls on the base unit. The video game controller interface adapter may further comprise means for translating platform-specific output signals from the video game playing platform into standard input signals for the base unit. The video game controller interface adapter may further comprise means for reconfiguring the standard output signals output from the base unit in response to selection of switches and controls to user-selectable standard output signals.

In further accordance with the present invention, a video game controller interface adapter is provided comprising a personality module interconnected with a base unit, wherein the personality module comprises an I/O controller that translates standard output signals from the base unit into platform-specific input signals for a video game playing platform, a memory circuit that provides storage area for constants, variables, and program code of the I/O controller, and a video game playing platform interface that physically and electrically interconnects the I/O controller with the video game playing platform, and a connector that physically interconnects the personality module with the video game playing platform. The video game playing platform may comprise a personal computer or a dedicated video game console. The personality module is adapted for repeated insertion to and extraction from the base unit. The I/O controller translates platform-specific output signals from the video game playing platform into standard input signals suitable for the base unit. The connector may comprise a video game playing platform connector and a cable interconnecting the video game playing platform connector with the personality module, the video game playing platform connector permitting repeated interconnection and disconnection of the personality module from the video game playing platform.

In still further accordance with the present invention, a video game controller system is provided which comprises a base unit comprising a plurality of user-selectable switches and controls, a video game playing platform comprising an interface port, and a video game controller interface adapter comprising a personality module interconnected with a base unit. The personality module comprises an I/O controller which translates standard output signals from the base unit into platform-specific input signals for a video game playing platform, a memory circuit which provides storage area for constants, variables, and program code of the I/O controller, and a video game playing platform interface which physically and electrically interconnects the I/O controller with the video game playing platform. A connector physically interconnects the personality module with the video game playing platform interface port. The personality module translates platform-specific output signals from the video game playing platform into standard input signals for the base unit. The video game controller interface adapter enables interconnection between the base unit and a plurality of different video game playing platforms.

DETAILED DESCRIPTION OF THE PREFERRED EMBODIMENT

Figure 1:
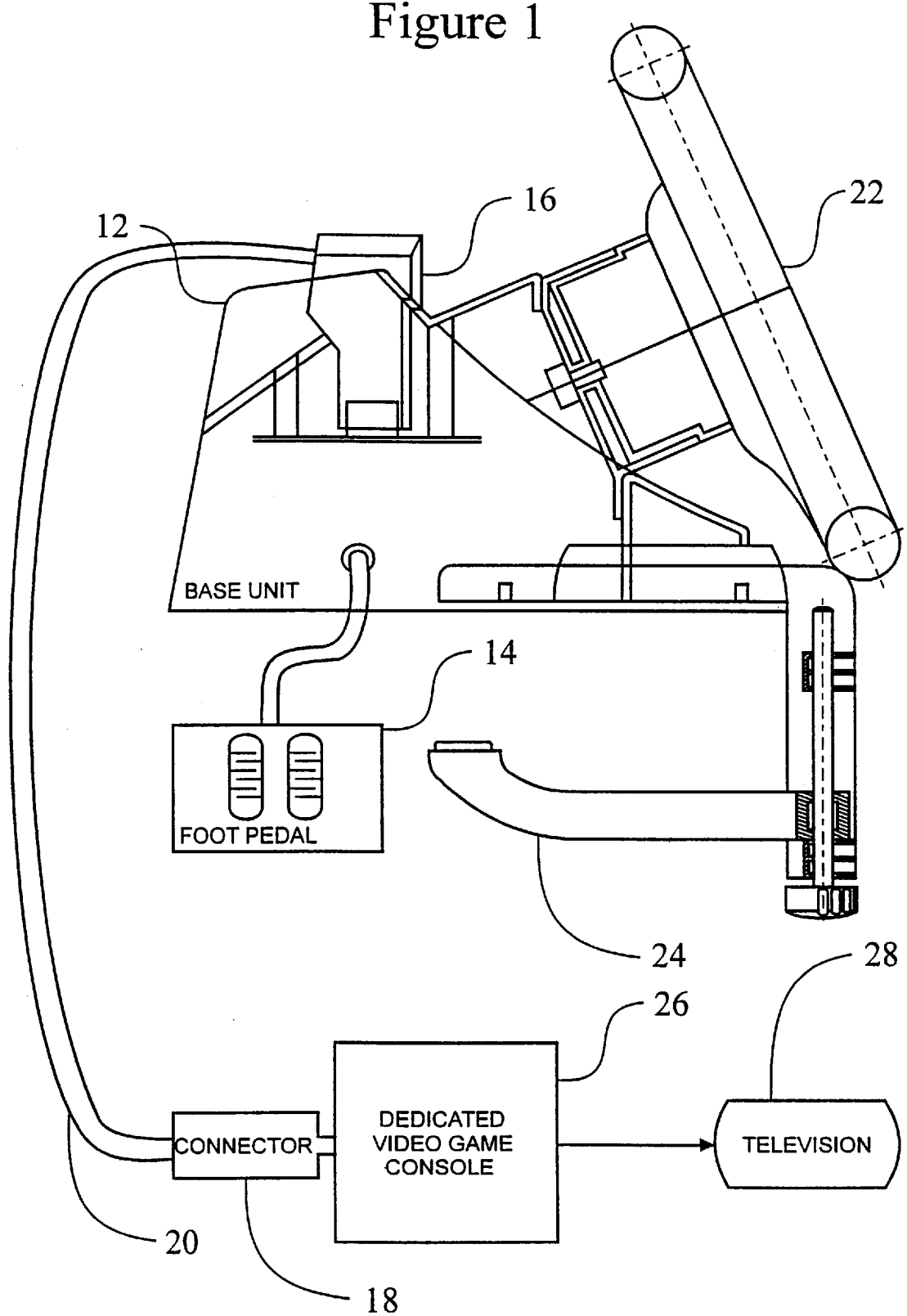
FIG. 1 illustrates a first embodiment of a modular video game controller system of the present invention that is configured to operate with a dedicated video game console.

FIG. 1 illustrates a first embodiment of a modular video game controller system 10 of the present invention that is configured to function with and includes a dedicated video game console 26 such as the NINTENDO™ N64™ game playing device. The system 10 of the preferred embodiment is useful in playing a car race video game and comprises a base unit 12, a set of foot pedals 14, and a video game controller interface adapter. The video game controller interface adapter comprises a personality module 16, a dedicated connector 18 and a cable 20 which links the connector 18 with the personality module 16. The base unit 12 comprises a steering wheel 22, a plurality of game playing switches (not shown), an optional force-feedback motor (not shown), display (not shown) and a mounting fixture 24 adapted for affixing the base unit 12 to a horizontal surface such as a table.

In general, a user will participate in a video game (such as a car race game) by rotating the steering wheel 22, depressing the foot pedals 14 and selecting one or more of the plurality of switches on the base unit 12, each of which will transmit certain standard output signals indicating a specific action. The standard output signals will then be translated by the personality module 16 into platform-specific input signals which are suitable for processing by a video game playing platform such as the dedicated video game console 26, and transmitted to the dedicated connector 18 via the cable 20. Upon receipt of the platform-specific input signals by the dedicated video game console 26 from the connector 18, the appropriate action will be taken by the video game program and display and sound signals will be transmitted to a display or television 28 by means well known in the art. Similarly, the dedicated video game console 26 may optionally transmit platform-specific output signals to the personality module 16 via the connector 18 and cable 20, which are then translated into standard input signals and used by the base unit 12 in, for instance, the display on the base unit 12.

The mechanical design of the personality module 16 permits it to be repeatedly inserted into and extracted from the base unit 12. Likewise, the connector 18 may be repeatedly connected and disconnected from the dedicated video game console 26. Thus, the video game controller interface adapter comprising the personality module 16, the cable 20, and the connector 18 can be used as a unit in order to interface between the base unit 12 and a variety of different video game playing devices or platforms such as any type of dedicated video game console 26 or a personal computer. It is anticipated that the base unit 12 will generically be applicable to all video game playing platforms and that a different video game controller interface adapter will be implemented for each particular platform by modifying circuitry within the personality module 16 (to accommodate the various electrical protocols) and the physical characteristics and quantity of dedicated connectors 18 (if required). Details regarding the circuitry within the personality module 16 is illustrated in FIGS. 3A–B, 4 and 7, and described in greater detail below. Thus, the user may continue using the same base unit 12 he has purchased and become accustomed to and proficient with for video games to be played on different platforms merely by exchanging video game controller interface adapter.

Figure 2:
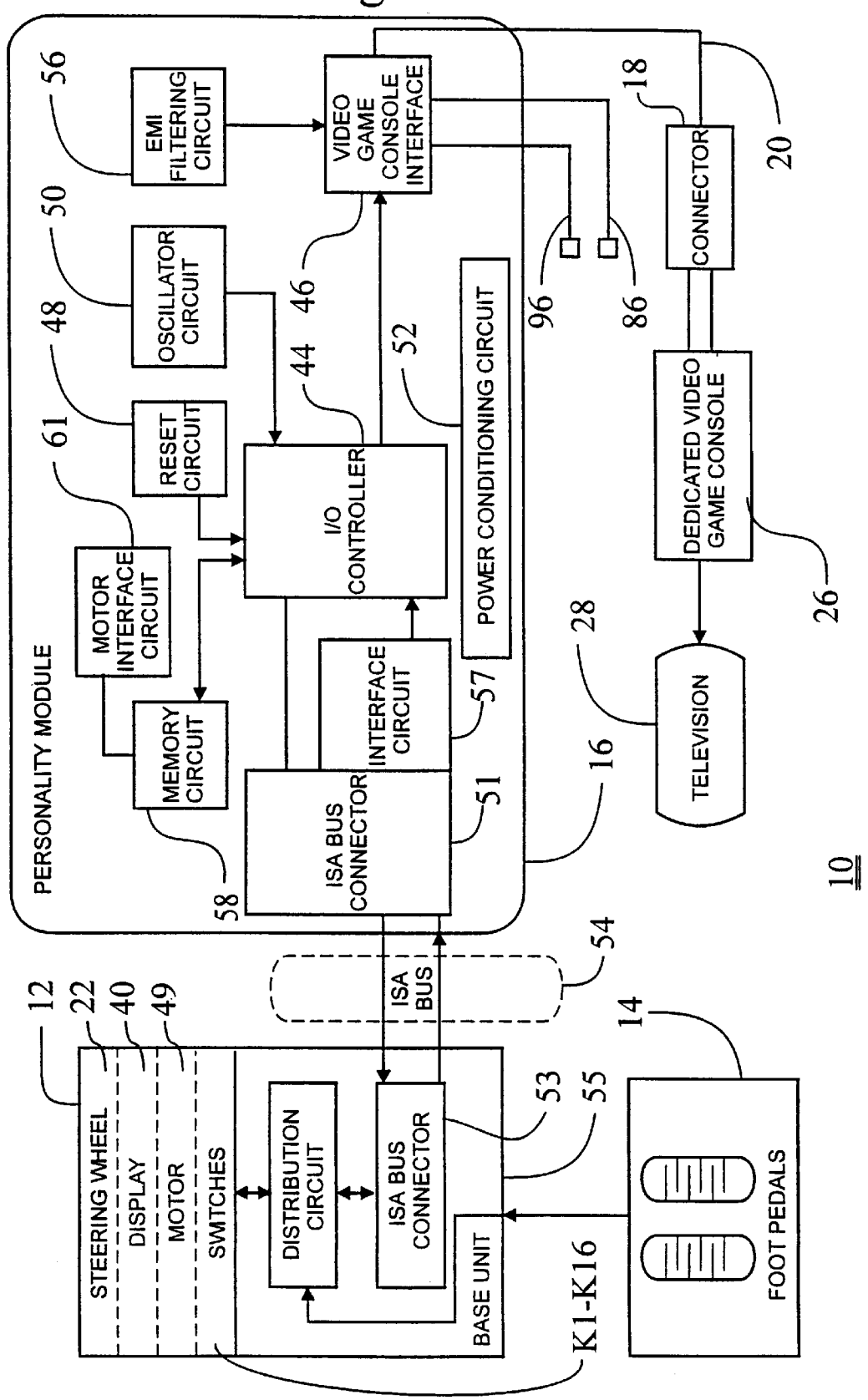
FIG. 2 illustrates a block diagram of the video game controller system of FIG. 1.

FIG. 2 illustrates a block diagram of the video game controller system 10 of FIG. 1. As in FIG. 1, the standard output signals from the base unit 12 are translated into platform-specific input signals by the personality module 16 and applied to the dedicated video game console 26 via the cable and connector 18, which may ultimately effect the display of the video program on the television 28. The personality module 16 comprises a reset circuit 48 and an oscillator circuit 50, which provide an I/O controller 44 with a stable reset signal and clock signal, respectively, by means well known in the art. A power conditioning circuit 52 provides filtering of the power supply via capacitance and resistance between voltage supply terminals for the integrated circuits used in the personality module 16 by means well known in the art. An industry standard ISA bus 54 is utilized as an interconnection standard between the base unit 12 and the personality module 16. The Industry Standard Architecture (ISA) bus is described in detail in D. Christiansen, *Electronics Engineers Handbook* section 11 ($4^{th}$ edition, 1997), which is hereby incorporated by reference. A number of alternative buses that are well known in the art could also be utilized within the scope of the present invention, such as EISA, MCA, and PCI. Also included in the personality module are an emi filtering circuit 56, a video game console interface 46, a memory circuit 58, an interface circuit 57, and a motor interface circuit 61.

Figure 2A:
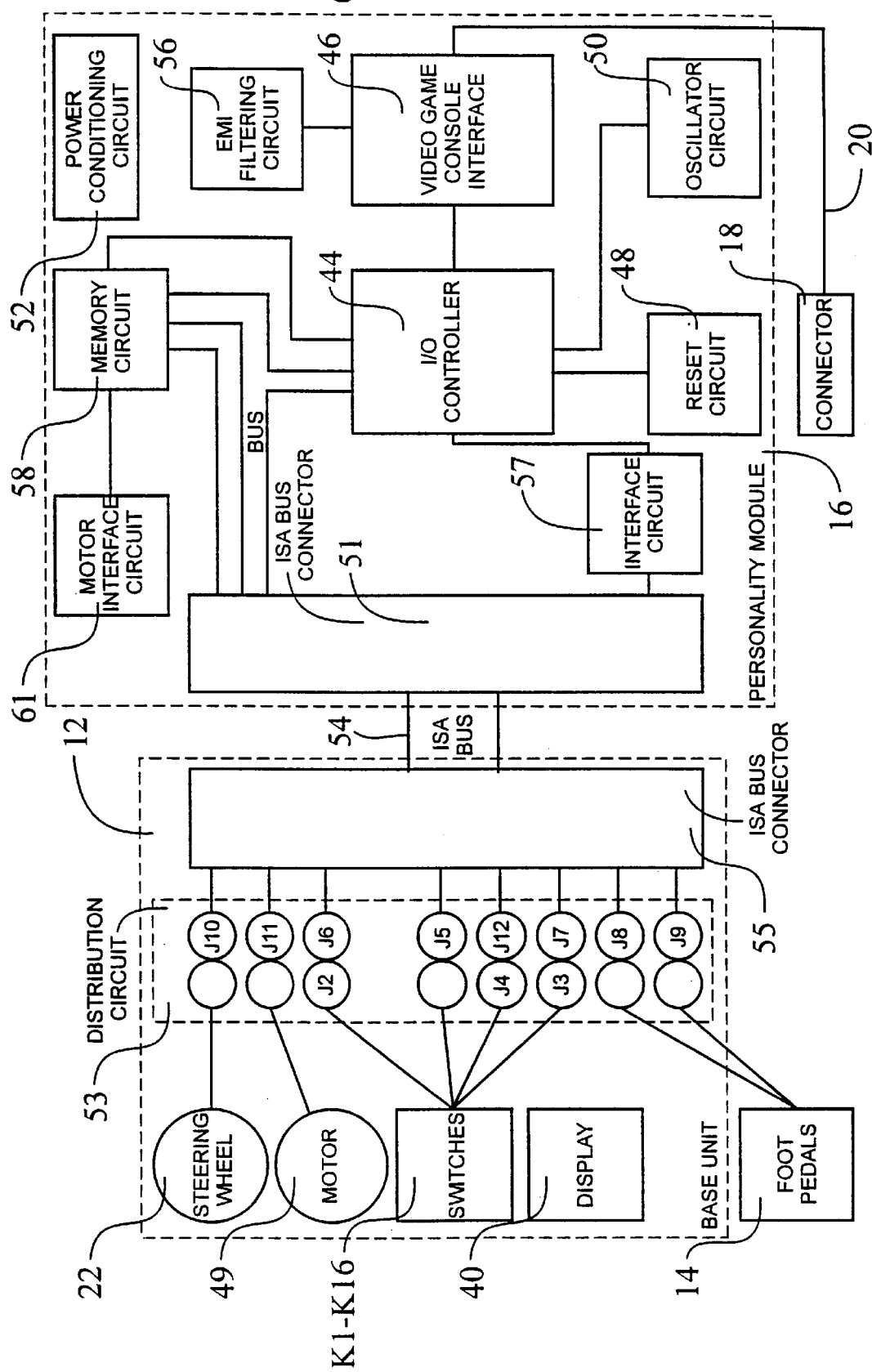
FIG. 2A illustrates a block diagram providing greater details regarding a base unit and personality module of the video game controller system of FIG. 1.

FIG. 2A is a block diagram that illustrates additional details of the base unit 12 and the personality module 16. An ISA bus connector 55 in the base unit interconnects with the ISA bus connector 51 from the personality module 16 with a distribution circuit 53 comprising a set of internal connectors J2–J12, and discrete components such as resistors and diodes (not shown) for interface purposes. The connectors in the distribution circuit then interconnect with the various signals from the steering wheel 22, force-feedback motor 49, switches K1–K16, display 40 and foot pedals 14. As indicated in FIG. 2A, the memory circuit 58 and I/O controller 44 can be implemented using a shared data, address and control bus.

Figure 3A:
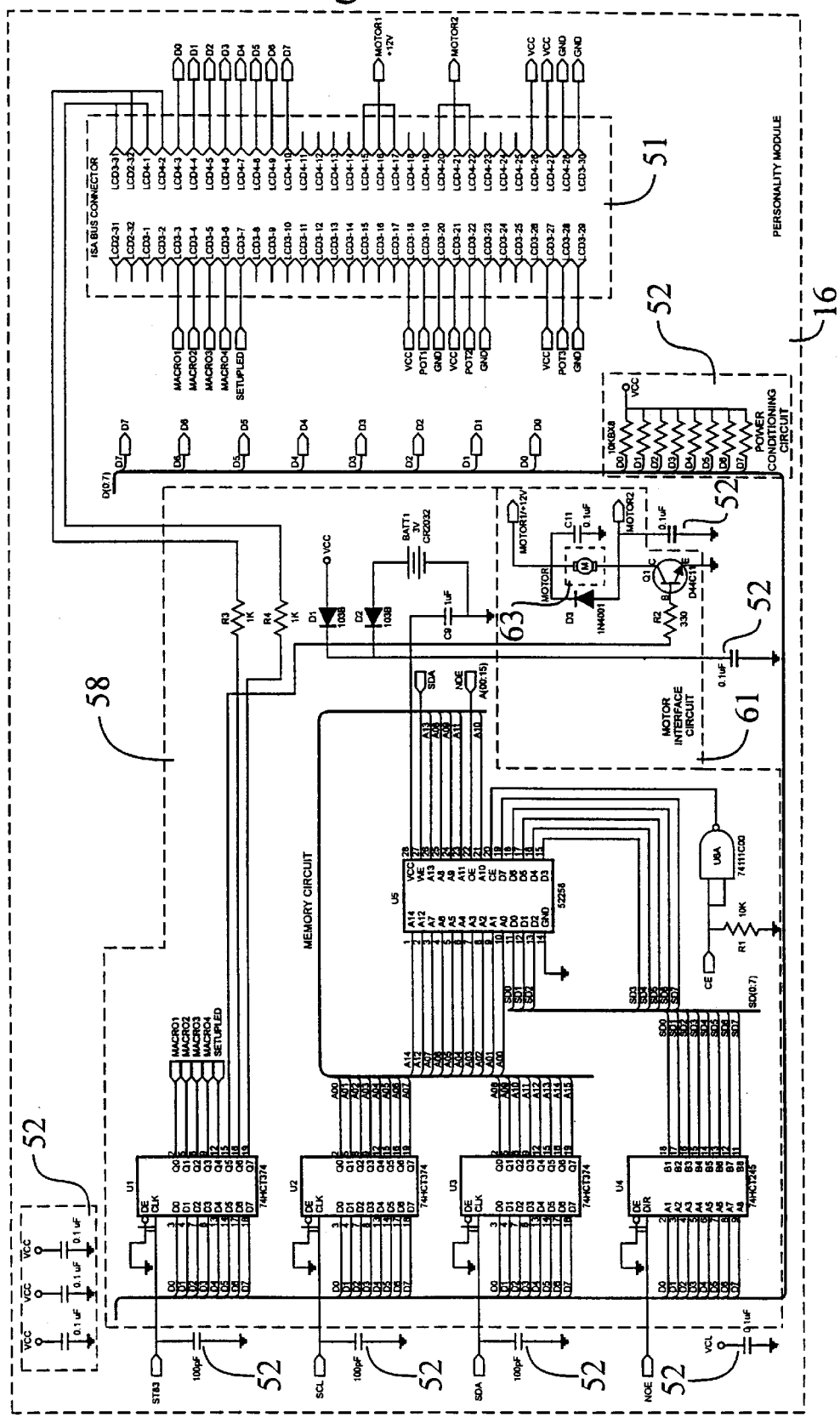
FIGS. 3A–D illustrate a schematic of a first embodiment of a base unit circuit and a personality module circuit of the video game controller system of FIG. 2A.
Figure 3B:
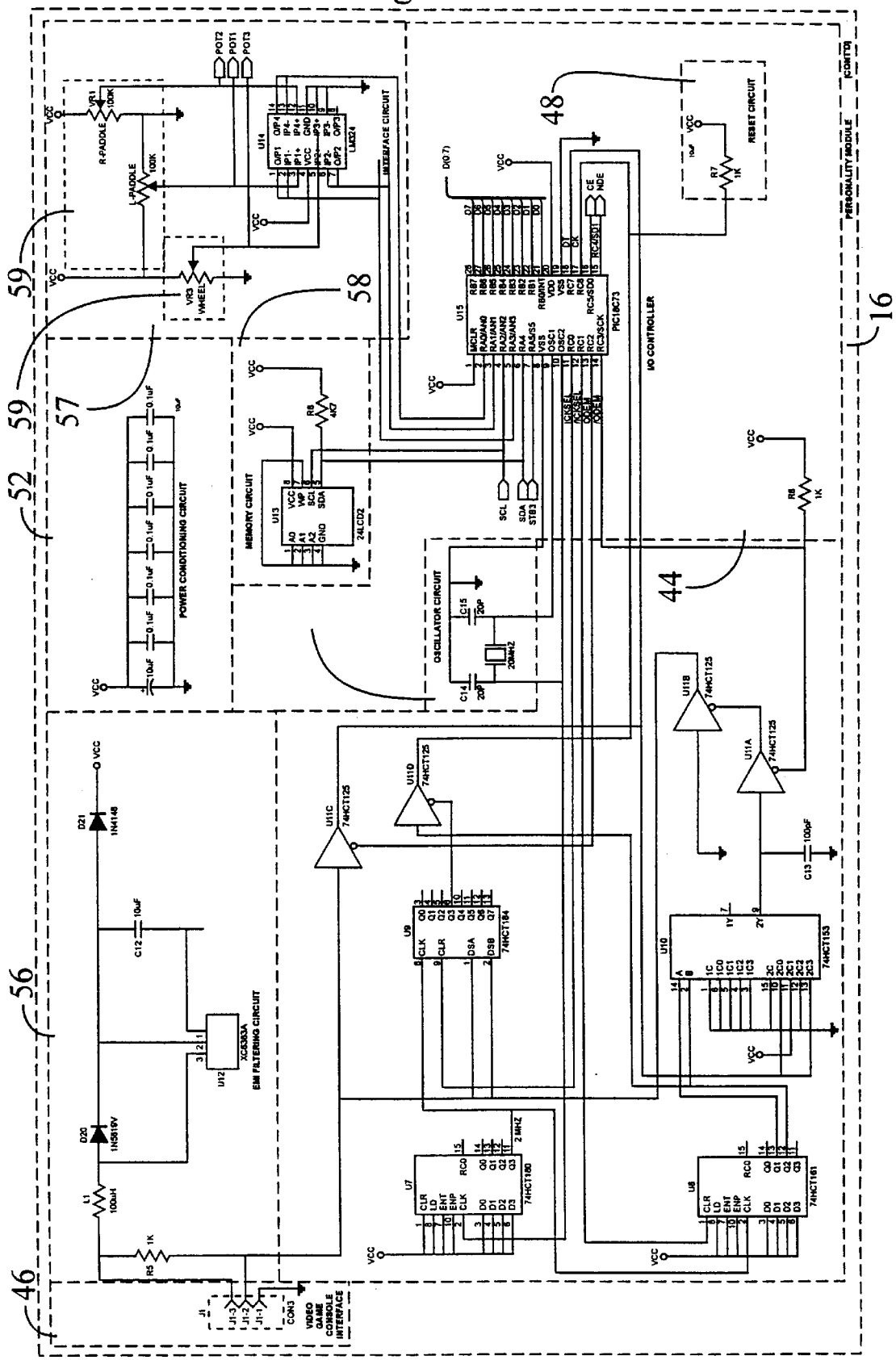
Figure 3C:
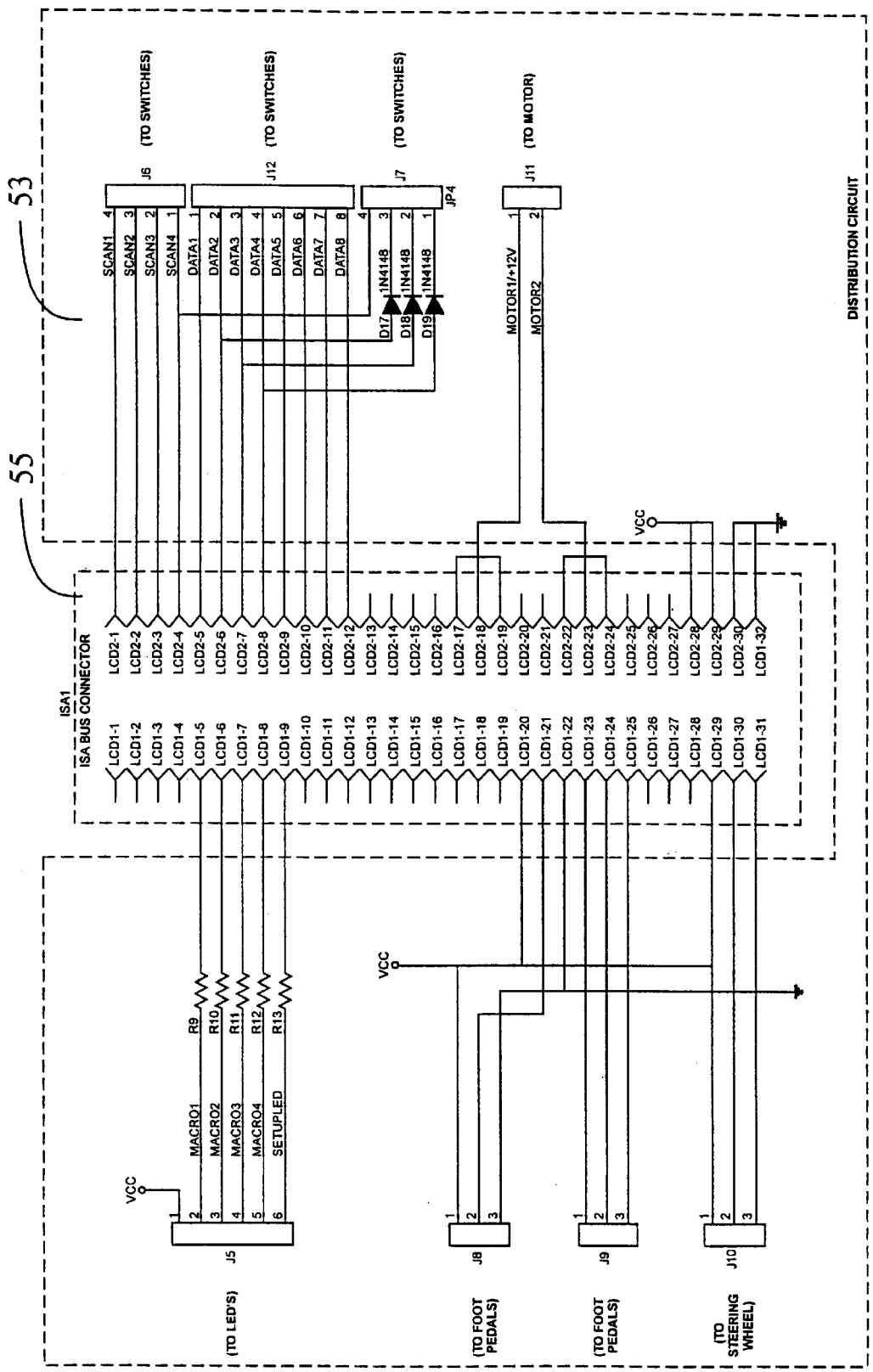
Figure 3D:
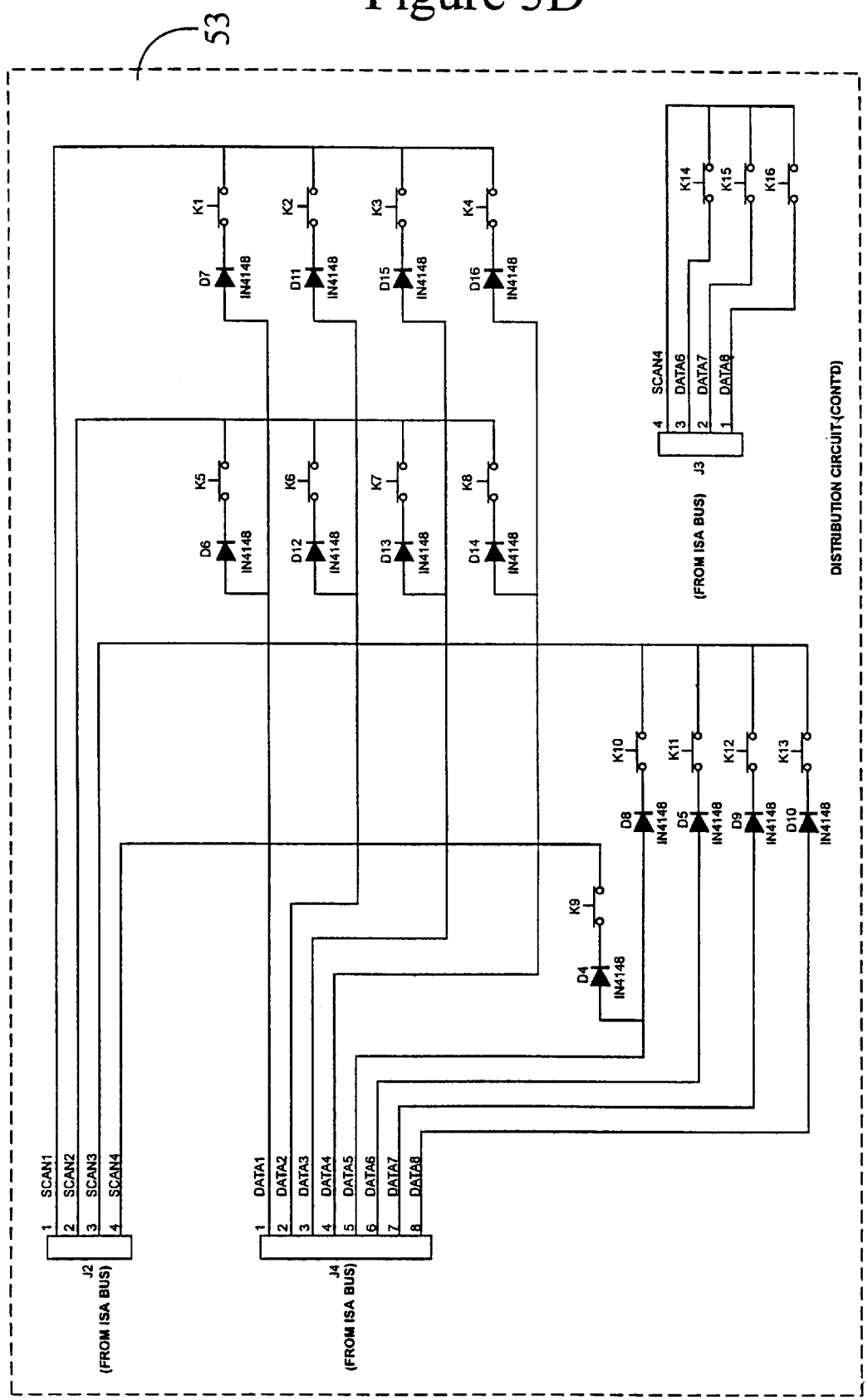

FIGS. 3A–D illustrate a schematic representation of the circuitry in the base unit 12 and the personality module 16 for a first embodiment of the video game controller system configured to interface with the NINTENDO™ N64™ video game playing platform. As shown in FIGS. 3C and 3D, the distribution circuit 53 comprises the connectors J2–J12 that interconnect the steering wheel, display switches, force-feedback motor and foot pedal to a 62 pin ISA bus connector 55. The distribution circuit also comprises five series limiting resistors R9 through R13, and three 1N4148 diodes D17 through D19, which electrically condition these interconnections. The distribution circuit 53 is coupled with a matrix of switches K1 through K16 and 1N4148 diodes D4 through D16, which provide signals through connectors J2–J5, J7 and the ISA bus connector 55 to the personality module 16 that enable the I/O controller 44 to determine which switch has been activated by means well known in the art. The various switches K1–K16 are used for game playing (i.e., ignition, gear shifts, etc.) as well as for configuration and control of the base unit itself (e.g., setup, Macro 1–4, etc.).

Referring to FIGS. 3A and 3B, the personality module 16 comprises the oscillator circuit 50, memory circuit 58, power conditioning circuit 52, ISA bus connector 51, EMI filtering circuit 56, video game console interface 46, motor interface circuit 61, interface circuit 57, and I/O controller 44. The oscillator circuit 58 provides a 20 Mhz clock to the I/O controller 44 according to the required electrical specifications of the I/O controller 44 by means well known in the art and comprises a 20 Mhz crystal and two 20 pF capacitors C14 and C15.

The memory circuit 58 provides the I/O controller 44 with nonvolatile storage area for programs, key codes, data and other variables that are not stored within the I/O controller 44, and compromises a 24LC02 serial EPROM U13, a 52256 RAM U5 with battery backup (comprising two 103B diodes D1 and D2, a 0.1 uF capacitor C9, and a 3V CR2032 battery BAT1), 74HCT374 address latches U2 and U3, a 74HC00 nand gate U6A, a 10K pulldown resistor R1, a 4.7 k pullup resistor, a 74HCT374 addressable latch U1, two 1 k series limiting resistors R3 and R4, and a 74HCT245 data transceiver U4.

The I/O controller 44 controls the translation of standard output signals from the base unit 12 into platform-specific input signals that comply with the electrical specifications and protocol of the dedicated video game console 26 as well as the translation of platform-specific output signals from the dedicated video game console 26 into standard input signals suitable for application at the base unit 12 (e.g., during a reconfiguration of the switches K1 through K13). The I/O controller 44 comprises an 8-bit CMOS microcontroller such as the PIC16C73 manufactured by Microchip Technology, Inc. and additional support devices including counters (74HCT160 U7, 74HCT164 U9, 74HCT161 U8), a 74HCT153 multiplexor U10, and 74HCT125 buffers U11A–D. The PIC16C73 comprises a high-performance RISC based CPU with the following characteristics and peripherals:

1. the majority of instructions execute in a single cycle;
2. 8 k×14 words of program memory and 368×8 bytes of data memory on board;
3. interrupt capability;
4. a watchdog timer;
5. three peripheral timers;
6. an 8-bit analog-to-digital converter; and
7. a synchronous serial port.

The EMI filtering circuit 56 has been included in the design in order to comply with federal regulations governing electromagnetic interference and comprises an 1000 uH inductor L1, a 1 k resistor R5, two 1N4148 diodes D20 and D21, a 10 uF capacitor C12 and a XC6383A emi filter U12.

The ISA bus connector 51 interfaces signals in the personality module 16 with the base unit 12. The power conditioning circuit 52 provides bypass capacitance, and power conditioning for the devices in the personality module 16, and comprises capacitors (100 pF, 0.1 uF and 10 uF) and resistors (10K×8 ohms) as shown in FIGS. 3A and 3B.

The motor interface circuit 61 provides the signals required to control the optional force-feedback motor in the base unit 12. The force-feedback motor 63 depicted within the motor interface circuit 61 is actually located in the base unit, and illustrated as force-feedback motor 49 in FIGS. 2 and 2A, but has been reproduced within the motor interface circuit 61 of the personality module 16 in order to clarify electrical connectivity. The force-feedback motor 63 provides torque or resistance to the rotation of the steering wheel under predetermined conditions in order to enhance the sensation of realism to the user. The motor interface circuit 61 comprises a 330 ohm resistor R2, a 0.1 uF capacitor C11, a 1N4001 diode D3 and a D44C11 transistor Q1.

As shown in FIG. 3B, the interface circuit 59 comprises an LM324 op amp U14 that interfaces three signals POT1, POT2, POT3 from the ISA bus connector 51 (shown in FIG. A, which have varying potentials based upon the relative positions of the foot pedals 14 and the steering wheel 22, respectively. The three 100 k potentiometers VR1, VR2 and VR3, illustrated within block 59, are associated with the foot pedals and steering wheel located in the base unit but are reproduced within the personality module 16 in order to more clearly illustrate the electrical connectivity.

Information from the switches, foot pedals, display, force-feedback motor, and steering wheel on the base unit is provided to the I/O controller 51 in the form of analog and digital standard output signals. The analog standard output signals are converted to digital signals by the analog-to-digital converters in the I/O controller 44. The I/O controller 44 periodically monitors the value of the digital and digitally converted analog signals to obtain digital values which represent, for instance, the degree of rotation of the steering wheel, position of each foot pedal and the identity of depressed switches. Periodic monitoring of the standard output signals can be based on an interrupt driven scheme or by polling at specific intervals by means well known in the art. Once the values of these signals is determined they can be converted or translated into platform specific input signals having a format, content and/or protocol suitable for interface with one or more of the dedicated video game consoles or personal computer through the use of data structures, control structures and algorithms within the I/O controller 44 by means well known in the art. Electrical characteristics of the platform specific input signals are matched to the dedicated video game console or personal computer by the I/O controller 44, video game console interface 46 and personal computer interface circuit. The electrical characteristics, format, content and/or protocol of the platform specific signal are well known in the art. The translation process just described can also be performed in reverse wherein platform specific output signals, which are output from the dedicated video game console are translated by the I/O controller 44 and memory circuit 58 into standard input signals suitable for control of the force-feedback force-feedback motor, switches, steering wheel and display on the base unit. Additional circuitry well known in the art may be required for such an interface such as digital-to-analog converters.

Figure 4:
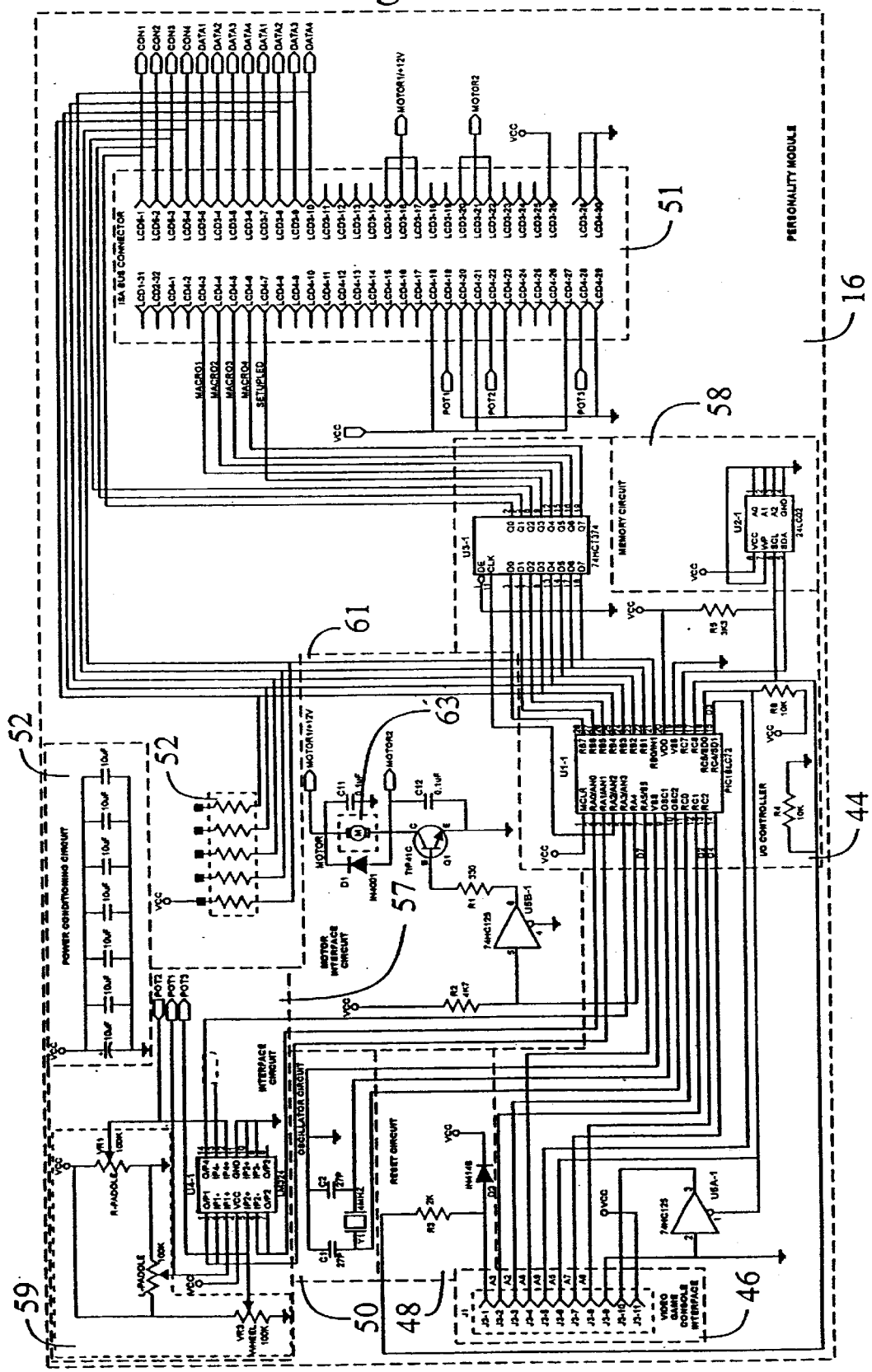
FIG. 4 illustrates a schematic of a second embodiment of the base unit circuit and the personality module circuit of the video game controller system of FIG. 2A.

FIG. 4 illustrates a schematic representation of the circuitry in the personality module 16 for a second embodiment of the video game controller system configured to interface with an alternative video game playing platform, which is well known in the art. The circuitry of FIG. 4 is substantially the same as the circuitry illustrated in FIGS. 3A–D and described above except for the following:

1. the oscillator circuit 50 operates at 4 Mhz
2. the I/O controller 44 comprises a PIC16L72
3. the video game console interface 46 comprises a greater number of pins
4. the program (not shown) resident in the I/O controller 44 and memory circuit 58 is modified to take into account the differences in electrical characteristics and protocol between the two video gaming platforms.
5. The emi filtering circuit 56 is not implemented.
6. The memory circuit does not comprise the 52256 RAM with support peripherals Substantially the same distribution circuit 53 and ISA bus connector 55 illustrated in FIGS. 3C–D is also required for the second embodiment illustrated in FIG. 4, however, it is not shown again for simplicity of illustration.

Reconfiguration of the functionality of the switches K1 through K16 in the two embodiments illustrated in FIGS. 3A–D, 4 and 7 is performed by selecting a setup switch (which can be any of he switches K1–K16), selecting the switch to be reconfigured and then pressing one or a sequence of additional switches. The functions associated with the additional switch or switches selected will be invoked upon selection of the reconfigured switch subsequent to reconfiguration (i.e. during game play). During the reconfiguration process an LED may be illuminated indicating that the functionality of the switches is being altered. Typically, some of the switches on the base unit 12 will invoke a predefined default function upon selection by the user during game play according to the specified protocol. In contrast, one or more of the remaining switches may not invoke a default function upon selection and are, therefore, suitable for reconfiguration by the user using those switches comprising default functions.

Figure 5:
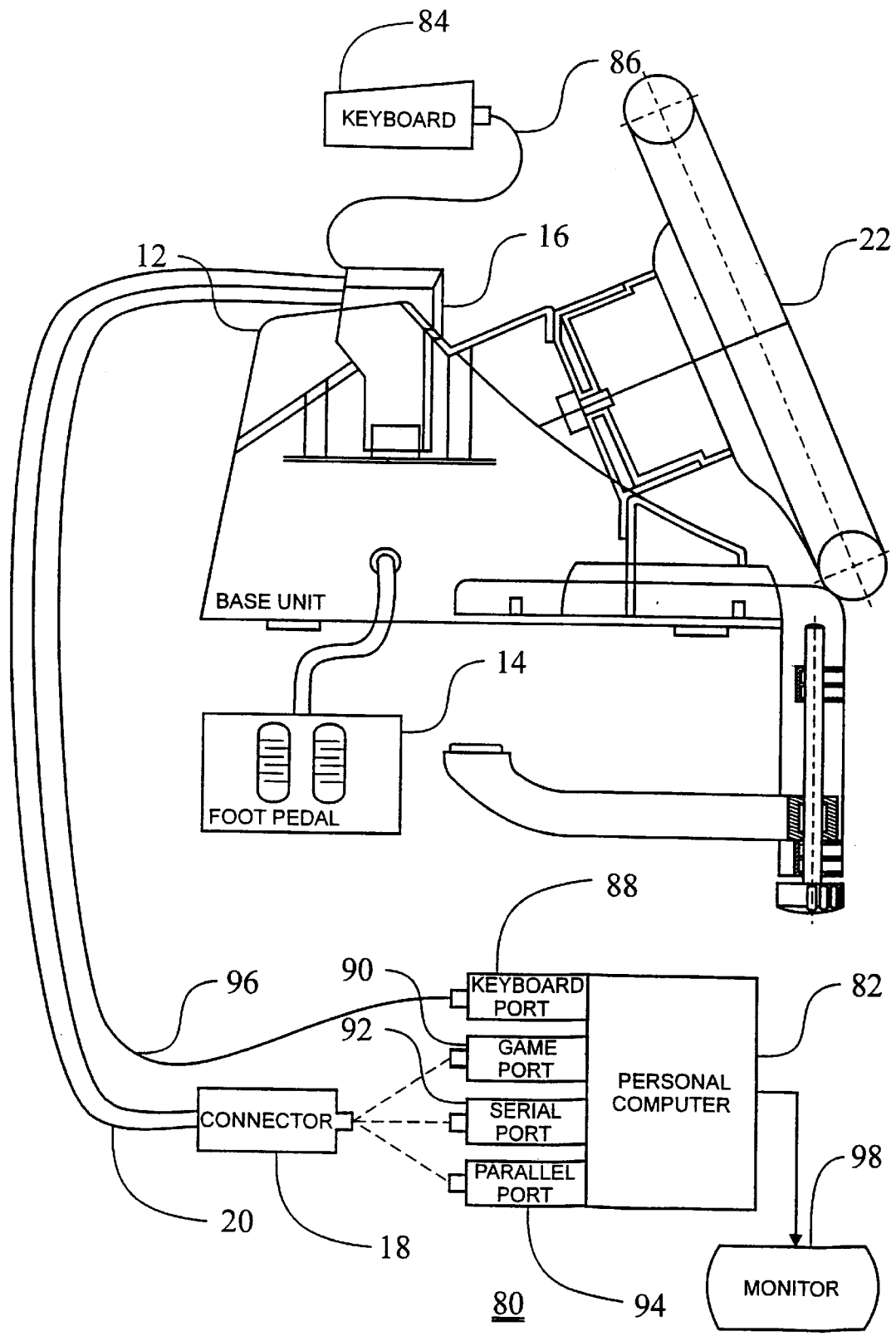
FIG. 5 illustrates a second embodiment of the modular video controller system of the present invention that is configured to operate with a personal computer.

FIG. 5 illustrates a video game controller system 80 which represents a third embodiment of the video game controller system 10 shown in FIG. 1 configured to operate with a personal computer video game playing platform. As described above, the third embodiment of the video game controller system 80 illustrates the adaptation of the generic base unit 12 by using a different video game controller interface adapter which has been specifically designed to electrically and physically interface with a personal computer 82. The discussion above concerning the first and second embodiments of the video game controller system 10 applies as well to the second embodiment of the video game controller system 80 with certain differences described below. One such difference, of course, is that the personality module 16 and the connector 18 must be designed to interface with platform-specific signals to and from the personal computer 82 rather than the dedicated video game console 26.

In addition, interfacing to the personal computer 82 permits reconfiguration of the standard output signals from the steering wheel 22, the foot pedals 14 and the plurality of switches on the base unit 12 (i.e., the switch codes) to correspond to a wide range of keyboard commands (i.e., key codes). As described in U.S. Pat. No. 5,551,701 to Bouton et al., which is hereby incorporated by reference, it is often desirable to reconfigure the keycodes emulated by a video game controller connected to the keyboard input of the personal computer 82, in order to adapt the switches to a variety of video games. In the preferred embodiment, key codes are sent to the personality module 16 for such reconfiguration in a Setup mode via a keyboard 84 and keyboard cable 86. During play, the personality module 16 transmits the key code to a keyboard port 88 on the personal computer 82 via a second keyboard cable 96. Although one type of reconfiguration technique is described in U.S. Pat. No. 5,551,701, a preferred type of reconfiguration is taught in co-pending U.S. patent application Ser. No. 08/878,999 filed on Jun. 19, 1997 and entitled RECONFIGURABLE VIDEO GAME CONTROLLER, which is owned by the assignee of this application and which is hereby incorporated by reference. Naturally, the personality module 16 requires different and/or additional circuitry from that disclosed in the first and second embodiments in order to accomplish switch code-to-key code assignment reconfiguration as well as interfacing to the personal computer 82 and monitor 98. In addition, the reconfiguration of switches K1 through K16, as described above in reference to the first two embodiments of the video game controller 10, is applicable to the third embodiment of the video game controller system 80 as well.

Similarly, the physical characteristics of the connector 18 and electrical and timing characteristics of the standard output signals from the base unit 12 must be adapted to comply with the electrical and protocol requirements of any or all (e.g., if multiple connectors were attached in parallel to the cable 20) of those ports available on the personal computer 82 such as the game port 90, serial port 92, parallel port 94 and universal serial port USB (not shown).

Figure 6:
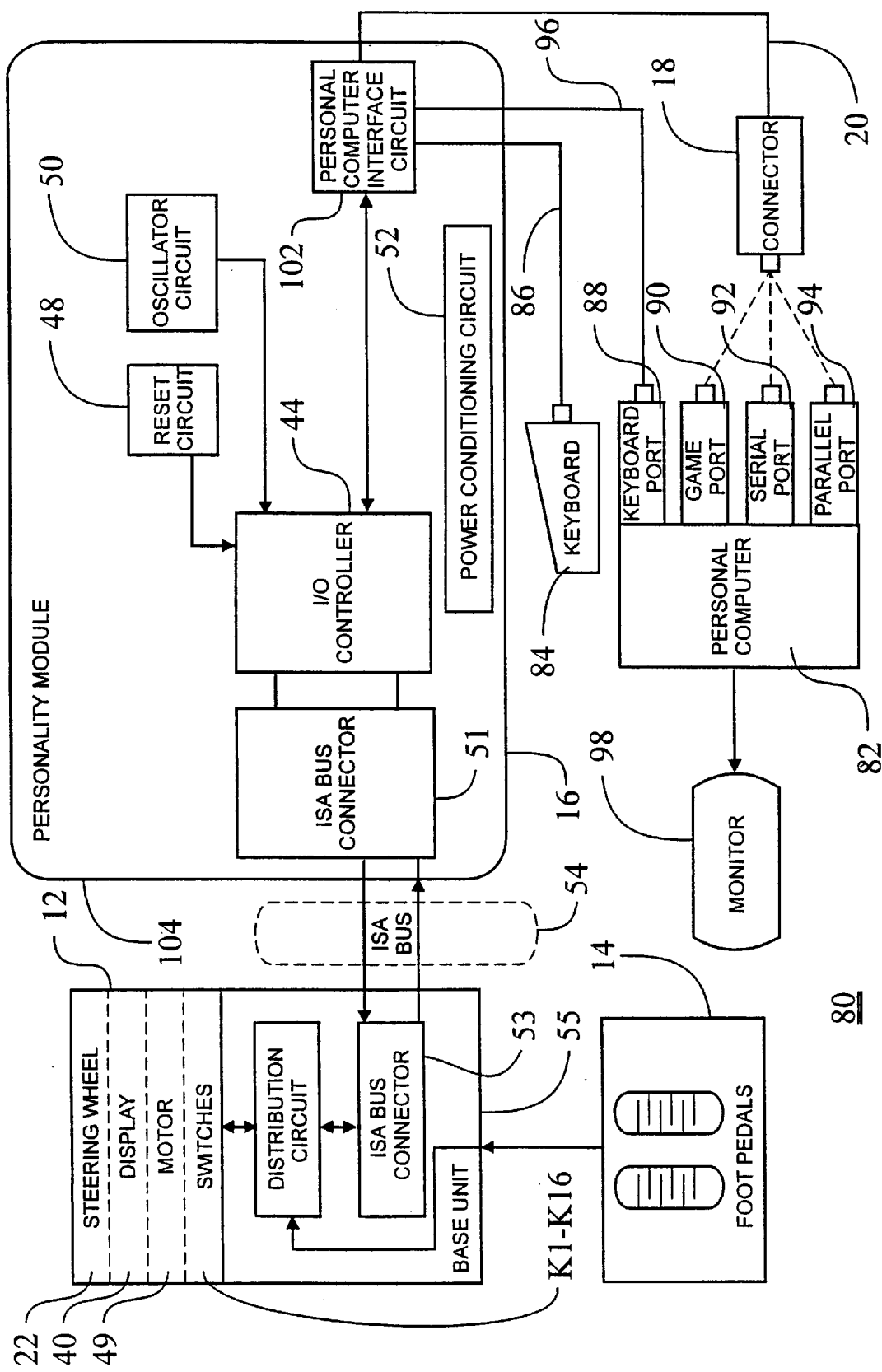
FIG. 6 illustrates a block diagram of the video game controller system of FIG. 5.

FIG. 6 illustrates a block diagram of the video game controller system 80 of FIG. 5 which is substantially the same as the block diagram of FIG. 2 except for the physical and electrical interconnection between the personal computer 82 and the connector 18; interconnection between the keyboard 84 and the personality module 16; and interconnection between the personal computer 82 and the personality module 16.

As with the personality module 16 illustrated in FIGS. 3A–B and 4, the standard output signals from the base unit 12 are applied to the I/O controller 44 of FIG. 6 through the ISA bus connector 51. The I/O controller 44 then processes and translates the standard output signals in order to derive intermediate signals which are functionally compatible with the personal computer 82. These intermediate signals are then applied to the personal computer interface circuit 102 which ensures that the intermediate signals match the electrical characteristics (e.g., rise time, overall timing and propagation delays, voltage levels, drive current) of the personal computer 82 and outputs them as platform-specific input signals to the personal computer 82 via the cable 20 and connector 18.

Figure 7:
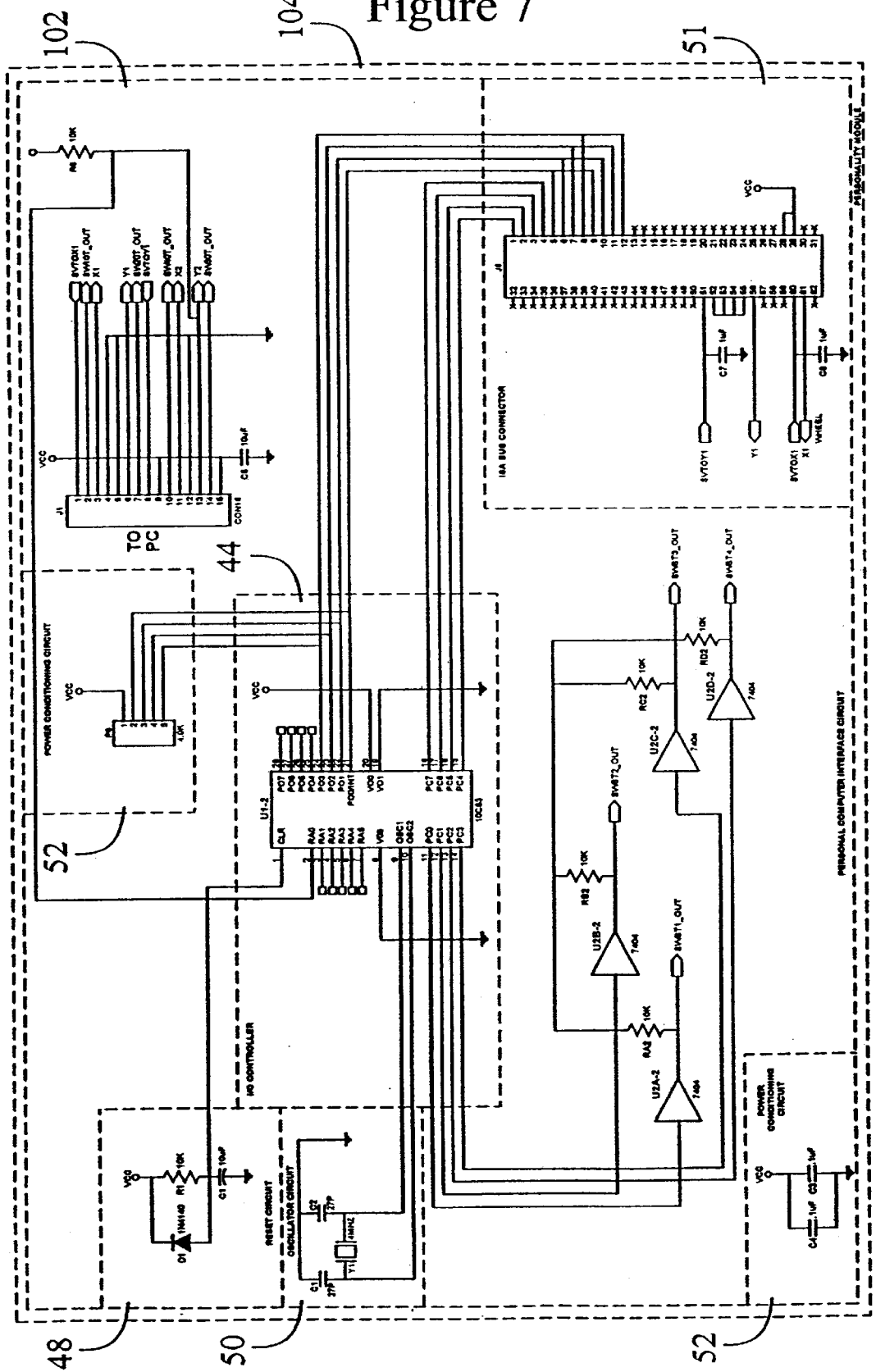
FIG. 7 illustrates a schematic of a personality module circuit of the video game controller system of FIG. 5.

FIG. 7 illustrates a schematic representation of the personality module circuit 104, the functions of which are essentially the same as that of the personality module circuit illustrated in FIGS. 3A–B and 4. However, the following hardware modifications have been made (largely due to the different protocol and electrical specifications of the personal computer 82 as compared to the dedicated video game console 26):

1. a 16C63 (manufactured by Microchip Technology, Inc.), which incorporates the memory circuit, has been substituted for the PIC16C72 and PIC16C73;
2. the oscillator has been reduced to 5 Mhz; and
3. the interface circuit and motor interface circuit have not been implemented.

Additional modifications have been made to the firmware (not shown) which directs the operation of the I/O controller 44 in order to properly interface signals between the base unit 12 and the personal computer 82. Substantially the same distribution circuit 53 and ISA bus connector 55 illustrated in FIGS. 3C–D is also required for the third embodiment illustrated in FIG. 7, however, it is not shown again for simplicity of illustration.

The reset circuit 48 illustrated in FIG. 7 comprises a 10 k ohm resistor R1, a 1N4148 diode D1, and a 10 uF capacitor C1. The power conditioning circuit 52 of the third embodiment comprises a 4.6K ohm pullup resistor pack R6, and two 0.1 uF capacitors (C4 and C5). The oscillator circuit 50 of the third embodiment comprises a 5 MHz crystal Y1, and two 27 pF capacitors (C2 and C3). The ISA bus connector circuit 51 of the third embodiment comprises a 64 pin ISA bus connector, and two 0.1 uF capacitors C7 and C8. A personal computer interface circuit 102 comprises a 16 pin header J1; five 10 k ohm resistors R6, RA2, RB2, RC2 and RD2; four 7404 inverters U2A-2, U2B-2, U2C-2 and U2D-2; and a 10 uF capacitor C6. The translation of standard output signals into platform specific input signals is performed by the I/O controller 44 through the use of data structures, control structures and algorithms well known in the art.

Although the invention has been shown and described with respect to best mode embodiments thereof, it should be understood by those skilled in the art that the foregoing and various other changes, omissions and additions in the form and detail thereof may be made therein without departing from the spirit and scope of the present invention. For example, the cable in the preferred embodiment may be substituted with a wireless communication mechanism such as radio frequency transmissions or the like well known in the art. Also, the steering wheel controller may be substituted with any type of controller such as a joystick, light gun, and the like.

What is claimed is:

1. A video game controller system comprising:
   (a) a base unit comprising
      a plurality of input devices operable by a user for generating control data in a common output format; and
      common output means coupled to said plurality of input devices for outputting said control data in said common output format, said output means comprising a common output connector, said common output connector comprising a plurality of metal output contacts suitable for transferring electrical signals comprising control data;
   (b) a plurality of interchangeable, independent video game interface adapters, each interface adapter comprising:
      common input connector means for connecting to said base unit common output connector, comprising a plurality of metal input contacts suitable for mechanical connection to said plurality of metal output contacts on said common output connector, and for receiving said electrical signals comprising control data therefrom in said common output format, said common input connector means being mechanically connectable to and disconnectable from said base unit common output connector such that different ones of said plurality of video game interface adapters may be independently mechanically interconnected to the base unit as desired;
      means for translating said control data received in said common output format to control data in one of a plurality of different platform-specific formats, each of which are different than said common output format; the platform-specific format for each one of said plurality of video game interface adapters being different from each other, and
      second output means for outputting said control data in said platform-specific format, said second output means comprising a platform-specific output connector.

2. The video game controller system of claim 1 further comprising:
   (c) a plurality of video game playing units, each of said video game playing units being operatively associated with one of said plurality of video game interface adapters, each comprising:
      a platform-specific input connector adapted to connect to the platform-specific output connector of the video game interface adapter with which said video game playing unit is operatively associated; and
      means for receiving said control data in said platform-specific format.

3. The video game controller system of claim 2 wherein said common input connector means and said means for translating are located in a housing adapted for connection and disconnection with said base unit common output connector, and further comprising a cable for connecting from said housing to said platform-specific output connector for transmission of said control data in said platform-specific format thereover.

4. The video game controller system of claim 3 in which said plurality of input devices comprise a steering wheel, said steering wheel generating control data proportionate to a rotational position of the steering wheel.

5. The video game controller system of claim 4 in which said plurality of input devices comprise a pedal device controllable by a foot of a user, said pedal device generating control data proportionate to a translational position of the foot pedal device.

6. The video game controller system of claim 5 in which at least one of said plurality of video game playing units is a general purpose computer.

7. The video game controller system of claim 5 in which at least one of said plurality of video game playing units is a dedicated video game console.

8. The video game controller system of claim 2 wherein at least one of said video game playing units is adapted to selectively generate feedback control data as a function of a video game being played thereon, said feedback control data being transmitted to said base unit via said video game interface adapter with which said video game playing unit is associated, and wherein said base unit further comprises means for responding to said feedback control data.

9. A method of playing a video game on a particular video game playing unit selected by a user, comprising the steps of:

(a) selecting, from a plurality of available interchangeable independent video game adapter interfaces, a particular video game adapter interface suitable for operating in conjunction with the selected video game playing unit;

(b) connecting a common input connector associated with said selected video game adapter interface and comprising a plurality of metal input contacts to a common output connector comprising a plurality of metal output contacts suitable for mechanical connection to said plurality of metal input contacts on said common input connector and associated with a base unit having a plurality of input devices capable of being operated by the user;

(c) connecting a platform-specific output connector associated with the selected video game adapter interface to a platform-specific input connector on the selected video game playing unit;

(d) controlling the plurality of input devices associated with the base unit;

(e) generating control data in a common output format as a result of the input device controlling step;

(f) outputting the control data in the common output format via the common output connector on said base unit to the common input connector on the selected video game adapter interface;

(g) translating the control data received in the common output format to control data in one of a plurality of different platform-specific formats, each of which are different than the common output format, the platform-specific format for each one of said plurality of video game interface adapters being different from each other; and (h) outputting the control data in the platform-specific format via the platform-specific output connector to platform-specific input connector on the selected video game playing unit.

* * * * *